US007684444B2

(12) United States Patent
Ko et al.

(10) Patent No.: US 7,684,444 B2
(45) Date of Patent: Mar. 23, 2010

(54) COMMUNICATION SYSTEM AND METHOD FOR MINIMUM BURST DURATION

(75) Inventors: Kenneth David Ko, Clearwater, FL (US); William Betts, St. Petersburg, FL (US); Rafael S. Martinez, Clearwater, FL (US)

(73) Assignee: Summit Technology Systems LP, Bala Cynwyd, PA (US)

( * ) Notice: Subject to any disclaimer, the term of this patent is extended or adjusted under 35 U.S.C. 154(b) by 707 days.

(21) Appl. No.: 10/513,561

(22) PCT Filed: May 5, 2003

(86) PCT No.: PCT/US03/14179

§ 371 (c)(1),
(2), (4) Date: Nov. 3, 2004

(87) PCT Pub. No.: WO03/094411

PCT Pub. Date: Nov. 13, 2003

(65) Prior Publication Data

US 2005/0226271 A1 Oct. 13, 2005

Related U.S. Application Data

(60) Provisional application No. 60/380,036, filed on May 6, 2002.

(51) Int. Cl.
*H04J 3/07* (2006.01)
(52) U.S. Cl. .................................... 370/505; 370/506
(58) Field of Classification Search ................ 370/470, 370/471, 474, 476, 487, 503, 505, 506, 509, 370/510, 512, 465, 472, 473
See application file for complete search history.

(56) References Cited

U.S. PATENT DOCUMENTS

| | | | |
|---|---|---|---|
| 3,766,316 A * | 10/1973 | Hoffman et al. ............ 375/368 |
| 5,999,541 A * | 12/1999 | Hinchey et al. ............. 370/466 |
| 6,373,860 B1 | 4/2002 | O'Toole et al. ............. 370/493 |
| 6,400,720 B1 * | 6/2002 | Ovadia et al. ........... 370/395.64 |
| 6,510,137 B1 | 1/2003 | Belaiche ..................... 370/232 |
| 6,563,789 B1 * | 5/2003 | Rasanen ..................... 370/230 |
| 6,597,680 B1 | 7/2003 | Lindskog et al. ............ 370/347 |
| 6,819,686 B1 * | 11/2004 | Frannhagen et al. ........ 370/535 |
| 2003/0185194 A1 * | 10/2003 | Borowski et al. ........... 370/349 |
| 2003/0193900 A1 * | 10/2003 | Zhang et al. ................ 370/252 |
| 2008/0175265 A1 * | 7/2008 | Yonge et al. ................ 370/447 |

* cited by examiner

*Primary Examiner*—Brenda Pham
(74) *Attorney, Agent, or Firm*—Woodcock Washburn LLP

(57) ABSTRACT

A system and method for providing a minimum burst duration in accordance with a regional standard and/or requirement. One embodiment comprises a first interface (204) configured to receive data to be communicated, a memory (208) configured to store a value corresponding to a regional minimum duration, a processor (202) configured to generate a frame, configured to compare a duration of the generated frame with the regional minimum duration, configured to add at least one padding symbol to the generated frame to generate a second frame, the second frame having a duration at least equal to the regional minimum duration, and a second interface (206) configured to communicate the second frame onto a communication channel.

24 Claims, 4 Drawing Sheets

COMMUNICATION SYSTEM AND METHOD FOR MINIMUM BURST DURATION

CROSS-REFERENCE TO RELATED APPLICATION

This application claims priority to copending PCT Application No. PCT/US03/14179, filed May 5, 2003, entitled "Communication System and Method for Minimum Burst Duration," which claims priority to, and the benefit of, the filing date of Provisional Application Ser. No. 60/380,036 entitled "COMMUNICATION SYSTEM AND METHOD FOR MINIMUM BURST DURATION" filed on May 6, 2002, which is hereby incorporated by reference.

TECHNICAL FIELD

The present invention relates generally to communications systems, and more particularly, to a system and method for a digital communication data formats.

BACKGROUND OF THE INVENTION

Data communication occurs as the transfer of information from one communication device to another. In some devices, data communications are accomplished by the use of a modem located at each communication endpoint. In the past, the term "modem" denoted a piece of communication apparatus that performed a modulation and demodulation function, hence the term modem. Today, the term modem is typically used to denote any piece of communication apparatus that enables the transfer of data and voice information from one location to another. For example, modern communication systems use many different technologies to perform the transfer of information from one location to another.

Digital subscriber line (DSL) technology is one vehicle for such transfer of information. DSL technology uses the widely available subscriber loop, the copper wire pair that extends from a telephone company central office to a residential location, over which communication services, including the exchange of voice and data, may be provisioned. DSL devices can be referred to as modems, or, more accurately, transceivers, which connect the telephone company central office to the user, or remote location typically, referred to as the customer premises. DSL communication devices utilize different types of modulation schemes and achieve widely varying communication rates. However, even the slowest DSL communications devices achieve data rates far in excess of conventional point-to-point modems.

DSL transceivers can be used to provision a variety of communication services using, for example, but not limited to, asynchronous transfer mode (ATM). ATM defines a communication protocol in which data cells are used to carry information over the DSL communication channel. The first portion of the ATM cell is typically used for overhead and the remaining portion is used to carry the communicated information or data. When using a switched-carrier transmission methodology, a control transceiver may be connected via the DSL to one or more remote transceivers. In such a communication scheme, the transmission is commonly referred to as "half-duplex," which is defined as two way electronic communication that takes place in only one direction at a time. With only a single remote transceiver on a line, switched-carrier transmission may instead be employed in full-duplex mode (allowing transmission in both directions simultaneously). In this case, full-duplex operation is typically enabled by employing either echo cancellation or frequency division multiplexing. Hybrid techniques are possible such as one in which there are multiple remote transceivers and communication takes place between the control transceiver and only one remote transceiver in full-duplex fashion.

Before the transmission of ATM cells, a preamble containing channel, transmission, address and administrative information may be transmitted by the transceiver. The application of this preamble is sometimes referred to as "framing" the data to be transmitted. The resulting sequence of symbols assembled for transmission, including preamble and (possibly) cells, is then referred to as a "frame". Due to the switched-carrier nature of the transmission, silence precedes this preamble. It is desirable to have the ability to precisely delimit the beginning and end of a transmission to within one transmitted symbol interval. Robustly delimiting the beginning of a frame enables a receiving transceiver to reliably begin decoding the frame at the correct symbol. Likewise, robustly delimiting at the end of a frame enables a receiving transceiver to reliably decode the entire frame through the final symbol, and then stopping so as to prevent data loss and to prevent the inclusion of any false data. Furthermore, by communicating an end of frame indicator to a receiving transceiver prior to the actual end of the frame, line turnaround time (ie., idle time on the line between transmissions) can be reduced, thereby increasing the effective use of the available line bandwidth.

Because the most efficient signal constellation encoding cannot allocate signal space to silence, it is impractical to reliably discriminate silence from a signal when analyzing only a single symbol encoding an arbitrary data value. To improve frame delimiting, existing techniques use special marker symbols whose symbol indices are greater than those used to encode data. At N bits per symbol (bps), data is encoded using symbol indices 0 through $2^N-1$. The special symbols use indices $2^N$ and above. While these special marker symbols are useful for marking the beginning and end of a transmission, their placement at the outer edges of a constellation raises the peak signal, thus increasing the peak to average ratio (PAR) across all data rates by as much as 4 dB. Unfortunately, discrimination of special symbols has the same error threshold as does decoding of data.

DSL systems typically operate in the presence of crosstalk from other DSL systems in the same loop plant (a communication system having a plurality of subscriber loops, where portions of the subscriber loops share a common location and are in close proximity to each other). Crosstalk is generated when a signal transmitted on one pair of wires couples electromagnetically to a nearby pair of wires to create an unwanted signal which is received together with the intended signal. DSI, systems use a variety of techniques to adapt to crosstalk, as well as the distortion introduced by the loop and other impairments. In order for a receiver residing in the transceiver to adapt to crosstalk, the crosstalk must be detectable.

DSL systems which use burst transmission are generally known as Short-Term Stationary (STS) systems. DSL systems are characterized by two distinct transmission states. An STS transceiver alternates between an ON state, in which a signal is transmitted, and an OFF state, in which either silence or a lower power and/or lower bandwidth signal is transmitted. The duration of individual ON and OFF periods may vary based on the presence of data to transmit and other factors. If the ON duration of a signal is significantly shorter than the minimum time period in which another DSL system can detect noise, the crosstalk may not be detected correctly. As a result, American National Standards Institute (ANSI) standard T1.417-2001 (Spectrum Management for Loop Transmission Systems), incorporated by reference herein, includes a requirement that the minimum transmission time for any transmission burst be at least 246 microseconds. See T1.417-2001 for additional background information on crosstalk, short-term stationary systems, and spectral compatibility requirements. It is possible that other regional requirements could be written that specify a different minimum transmission time.

One DSL method and apparatus meets the T1.417 requirement by adding a fixed number of padding symbols to empty frames to extend the length of those frames to the required, predefined minimum time. Such a DSL system is configured to operate in the United States and other regional communication systems that employ the T1.417 requirement.

In asynchronous transfer mode (ATM) cell based systems, transmissions can be extended in increments of one cell transmission period. However, this may be excessive relative to customer-specific requirements. The end-of-pad indication of the present invention allows a resolution to one symbol period even under poor communication conditions. Key system requirements such as scrambler initialization require accurate detection of the last symbol in the message. In modulation a false detection of the last symbol will cause a faulty upstream scrambler initialization and undetectable upstream data.

Other DSL systems are configured to operate in the other regional communication systems that employ standards and/or requirements that are different from the T1.417 requirement. Accordingly, equipment configured to operate under the T1.417 requirement may not be suitable for operation under other standards and/or requirements. When DSL equipment is to operate in regions having different standards and/or requirements, the equipment must be configured to operate using the standards and/or requirements of the region in which it is installed.

Having a variety of different DSL devices configured to operate under a variety of standards and/or requirements is undesirable because of the added cost to develop, manufacture and maintain separate DSL devices in a variety of locations, each location having different standards and/or requirements. Furthermore, the DSL equipment, once manufactured for a particular standard and/or requirement, is not interchangeable with DSL equipment used in another region having a different standard or requirement. Accordingly, if a DSL device, or one of its components, fails in the field, the failed device or component must be replaced using a device or component configured for operation under that particular standard and/or requirement. That is, a readily available "off-the-shelf" device or component cannot be used.

SUMMARY OF THE INVENTION

The present invention provides an system and method for providing a minimum burst duration in accordance with a regional standard and/or requirement. The minimum duration can be changed locally or remotely, to configure each device after deployment, without requiring synchronization of the change in the devices at each end of a communications channel. One embodiment comprises a first interface configured to receive data to be communicated, a memory configured to store a value corresponding to a regional minimum duration, a processor configured to generate a frame, configured to compare a duration of the generated frame with the regional minimum duration, configured to add at least one padding symbol to the generated frame to generate a second frame, the second frame having a duration at least equal to the regional minimum duration, and a second interface configured to communicate the second frame onto a communication channel.

Another embodiment is characterized as a process comprising generating a frame for transmission, comparing a duration of the generated frame with a minimum duration, adding at least one padding symbol to the generated frame such that a duration of a second frame is increased at least to a predetermined duration corresponding to at least the minimum duration, and communicating the second frame.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Although, described with particular reference to the transmission of asynchronous transfer mode (ATM) cells or the like over a digital subscriber loop (DSL) communication channel, the system and method for a variable burst duration system 200, which provides for a variable minimum burst duration, can be implemented to transmit all forms of data in any switched-carrier transmission system in which it is desirable to adjust the burst duration (corresponding lo the frame length) of a generated frame to ensure that minimum burst duration of the communicated frame satisfies a particular standard and/or requirement.

The specified minimum burst duration for a communicated frame corresponds to the size of the frame. In some situations, such as a header-only frame, the generated header-only frame burst duration (corresponding to the frame length) is less that the specified minimum burst duration. Accordingly, embodiments of the variable burst duration system 200 extend the burst duration (or frame length) of such a header-only frame, or other types of frames which have a duration less than the specified minimum burst duration. One embodiment adds or inserts padding symbols onto the frame to extend the burst duration to at least satisfy the specified minimum burst duration. Such a process is referred to herein as "header padding" for convenience. The padding symbol may be any suitable symbol, such as one comprising binary "zeros" or the like.

Figure 1:
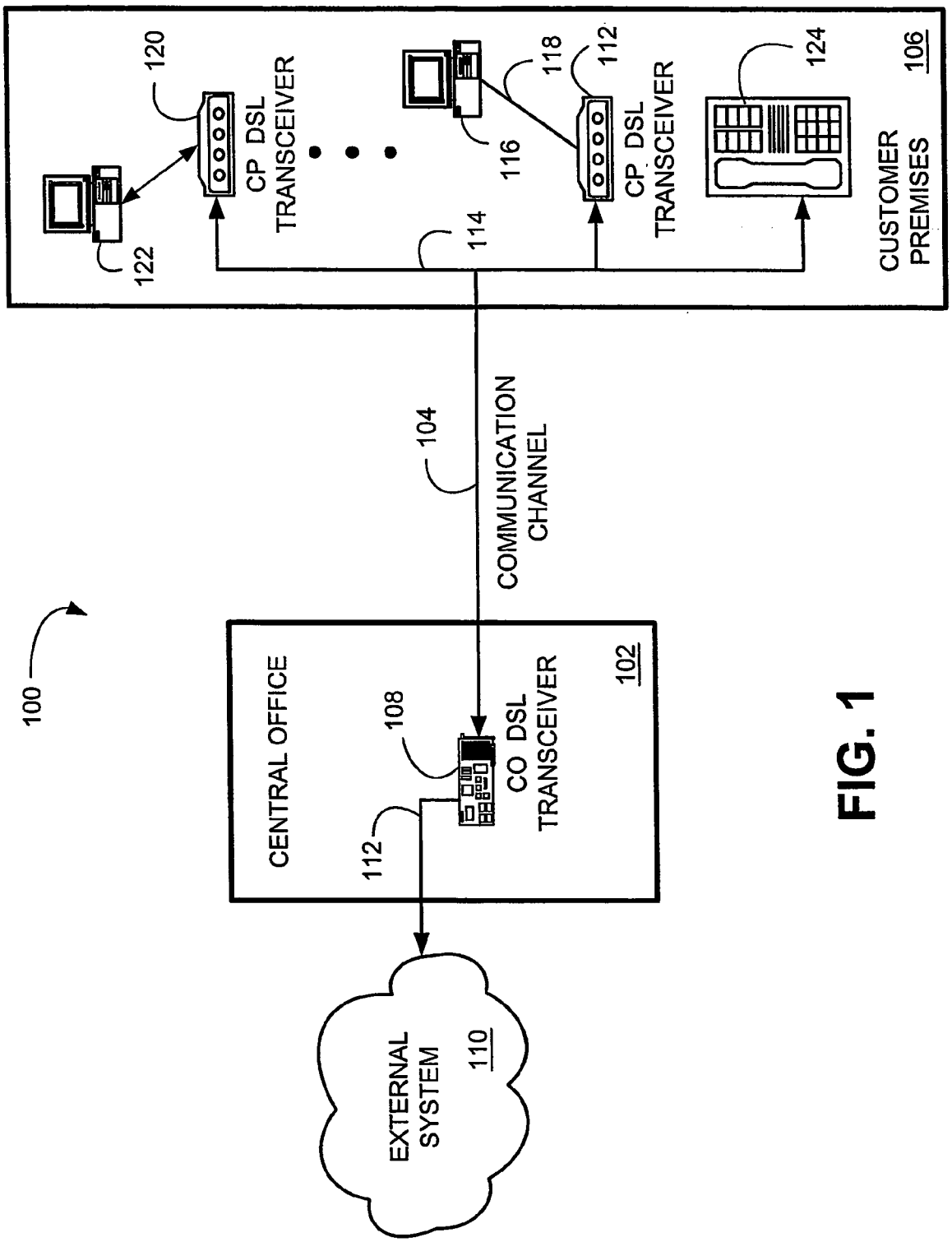
FIG. 1 is a schematic view illustrating a communication environment in which embodiments of DSL transceivers configured according to the present invention reside.
Figure 2:
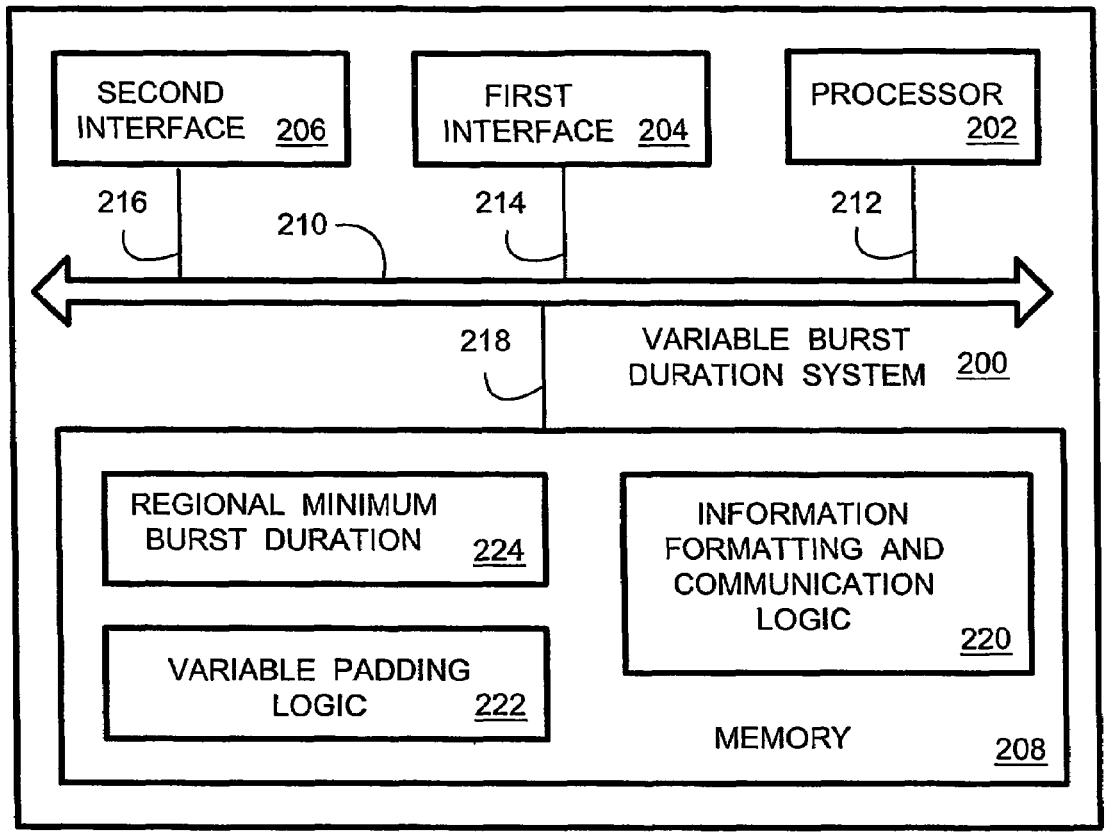
FIG. 2 is a block diagram illustrating an embodiment of a variable burst duration system implemented in the CO DSL transceiver and the CP DSL transceivers of FIG. 1.

FIG. 1 is a schematic view illustrating a communication environment 100, such as, but not limited to, a switched-carrier half-duplex system, in which embodiments of DSL transceivers configured according to the present invention reside, referred to herein as a variable burst duration system 200 (FIG. 2). The exemplary communication environment 100, includes central office 102 connected via communication channel 104 to customer premises 106. Communication channel 104 can be any physical medium over which communications signals can be exchanged. In one embodiment, communication channel 104 is the copper wire pair that extends from a telephone company central office to an end-user location, such as a home or office, referred to herein for convenience as the customer premises 106. Furthermore, communication channel 104 may terminate in any suitable location having communication equipment described herein and configured in accordance with the present invention.

Central office 102 includes a central office (CO) DSL transceiver 108 connected to communication channel 104. For convenience, the term "transceiver" includes a plurality of components configured to both transmit and receive communications. An illustrative example of a transceiver is a modem. It is understood that any suitable transceiver device may be configured with embodiments of the present invention.

CO DSL transceiver 108 processes data received from an external system 110, received via connection 112. Non-limiting examples of an external system include a public switched telephony system, a frame relay system or the Internet. It is understood that embodiments of the present invention are not limited by the nature of the external system 110 which communicates with CO DSL transceiver 108. Furthermore, either analog or digital communications may be communicated between the external system 110 and the DSL transceiver 108.

Customer premises 106 includes one or more customer premises (CP) DSL transceivers 112. DSL transceivers are connected, via the CP wiring 114 residing in the customer premises 106, to communication channel 104. The CP wiring 114 can be, for example but not limited to, the telephone wiring network within a private residence or within an office (the customer premises 106). Other suitable communication mediums may also be employed. CP DSL transceivers 112 can be connected to a variety of data terminal equipment (DTE) devices located at customer premises 106.

Although a variable burst duration system 200 will be described below in a half-duplex communication environment for convenience, the CO DSL transceiver 108 and the CP DSL transceiver 122 implemented with embodiments of the present invention may be used in a switched-carrier full-duplex environment as well. In such a case, full-duplex operation may be enabled using technologies such as echo cancellation or frequency division multiplexing.

Examples of embodiments of the present invention implemented in or with DTE devices include, but are not limited to, computer terminal 116. Other types of DTE device embodiments may include digital telephone devices, Internet television devices, audio and multimedia devices, facsimile (fax) devices, graphic devices, high-speed Internet devices, high-speed local access network (LAN) devices, Internet telephone devices, stereo/audio devices, digital television devices, digital video cassette recorder devices, utility meter devices, home management and security devices. Operation of such DTE devices are generally understood and are not further described since the embodiments of the present invention are easily configured to operate in or with the particular DTE device in which it is implemented.

Accordingly, CO DSL transceiver 108 communicates digital data, via communication channel 104, to the CP DSL transceiver 112, which then communicates the data to the above-described DTE device, to which it is connected to. For example, CP DSL transceiver 112, also referred to as a modem, is illustrated for convenience as connecting to computer terminal 116, via connection 118. CP DSL transceiver 112 may be an external component or reside within the computer terminal 116. Thus, computer terminal 116 may communicate data to a remote device (not shown) by communicating the data in a first format to the CP DSL transceiver 112. CP DSL transceiver converts the received data into a second format, in accordance with the present invention, and communicates the data in the second format to the CO DSL transceiver 108, via communication channel 104. The DSL transceiver then communicates the data onto the external system 110 in a suitable format. Communication of data from the remote device directed to the computer terminal 116 are communicated over the above-described path in a reverse direction.

Furthermore, additional DSL transceivers 120 can be located at customer premises 106. Accordingly, multipoint DSL operation between a plurality of customer premises DTE devices, such as computer terminal 122, and the CO DSL transceiver 108 may be supported by embodiments of the present invention. Frequency multiplexing and/or time domain multiplexing may be employed. The aspects of the invention discussed herein are applicable to both one CP DSL transceiver 112, or to a plurality of CP DSL transceiver 120, located at customer premises 106.

In addition, analog type devices residing at the customer premises 106 may simultaneously communicate over the communication channel 104 with another device (not shown) residing in the central office 102. An example of an analog type customer premises device is an analog telephone 124. Such analog devices communicate using a different channel (frequency spectrum) than the channels used by the DTE devices configured to communicate in accordance with the present invention. For example, an analog telephone communicates using the zero to 4 kHz frequency band, while DTE devices communicate at frequencies greater than 4 kHz. Operation of such analog communication devices are generally understood and are not further described herein.

FIG. 2 is a block diagram illustrating an embodiment of a variable burst duration system 200 implemented in the CO DSL transceiver 102 and the CP DSL transceivers 112, 120 (FIG. 1). The variable burst duration system 200 includes a processor 202, a first interface 204, a second interface 206 and a memory 208. Processor 202, first interface 204, second interface 206 and memory 208 are communicatively coupled through communications bus 210, via connections 212, 214, 216 and 218 respectively, thereby providing connectivity between the above-described components. In alternative embodiments of a variable burst duration system 200, the above-described components are connectivley coupled in a different manner than illustrated in FIG. 2. For example, one or more of the above-described components may be directly coupled to each other or may be coupled to each other via intermediary components (not shown). Furthermore, embodiments of the present invention may be implemented in any suitable transceiver configured to communicate using frames.

One embodiment of memory 208 further includes the information formatting and communication logic 220, the variable padding logic 222 and the regional minimum burst duration 224. The variable burst duration system 200, described in greater detail below, resides as firmware, software or other computer-readable medium executed by processor 202. For convenience, the information formatting and communication logic 220, and the variable padding logic 222, are illustrated as separate logical units. In another embodiment, the information formatting and communication logic 220, and the variable padding logic 222, are integrated together into a single logical unit.

In an embodiment of the variable burst duration system 200 implemented in the CO DSL transceiver 108 (FIG. 1), the above described communication channel 104 is coupled to the variable burst duration system 200 at the second interface 206. Thus, a communication from a CP DSL transceiver 112, 120 (FIG. 1) is received by the second interface 206, and is processed into a format that is communicated to the processor 202. Processor 202, while executing the information formatting and communication logic 220, can then process the received communication. The received communication is then further processed and transmitted onto connection 112, via the first interface 204. Accordingly, communications are processed into a suitable format for transmission to the external system 110 (FIG. 1) by processor 202, while executing the information formatting and communication logic 220. Similarly, communications from the external system 110 are received by the variable burst duration system 200 via the first interface 204, the communication is processed by processor 202 while executing the information formatting and communication logic 220, and then transmitted to a destination CP DSL transceiver 112, 120, via the second interface 206. Detailed processes of receiving and transmitting communications by a CO DSL transceiver 108, and the associated formatting of those communications, are not described in greater detail other than to the extent necessary to describe the operation of embodiments of the present invention.

In an embodiment of the variable burst duration system 200 implemented in one of the CP DSL transceivers 112, 120 (FIG. 1), the above described communication channel 104 is coupled to the variable burst duration system 200 at the second interface 206. Thus, a communication from a CP DSL transceiver 112, 120 (FIG. 1) is received by the second interface 206, and is processed into a format that is communicated to the processor 202. Processor 202, while executing the information formatting and communication logic 220, can then process the received communication. The received communication is then further processed and transmitted to a CP DTE device, such as computer terminal 118 (FIG. 1), via the first interface 204. Accordingly, communications are processed into a suitable format for transmission to the computer terminal 118 by processor 202, while executing the information formatting and communication logic 220. Similarly, communications from the computer terminal 118 are received by the variable burst duration system 200 via the first interface 204, the communication is processed by processor 202 while executing the information formatting and communication logic 220, and then transmitted to the CO DSL transceiver 108 via the second interface 206. Detailed processes of receiving and transmitting communications by a CP DSL transceiver 112, 120, and the associated formatting of those communications, are not described in greater detail herein other than to the extent necessary to describe the operation of embodiments of the present invention.

Figure 3A:
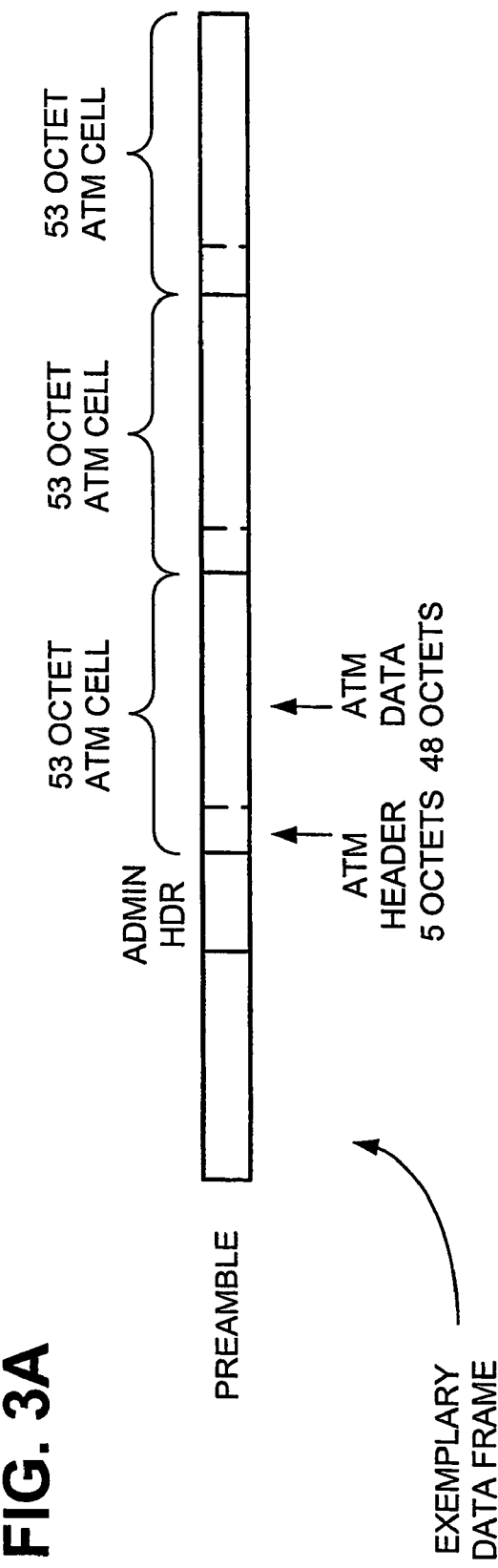
FIG. 3A is a schematic view illustrating the bit to symbol relationship of a data frame communication having data.
Figure 3B:
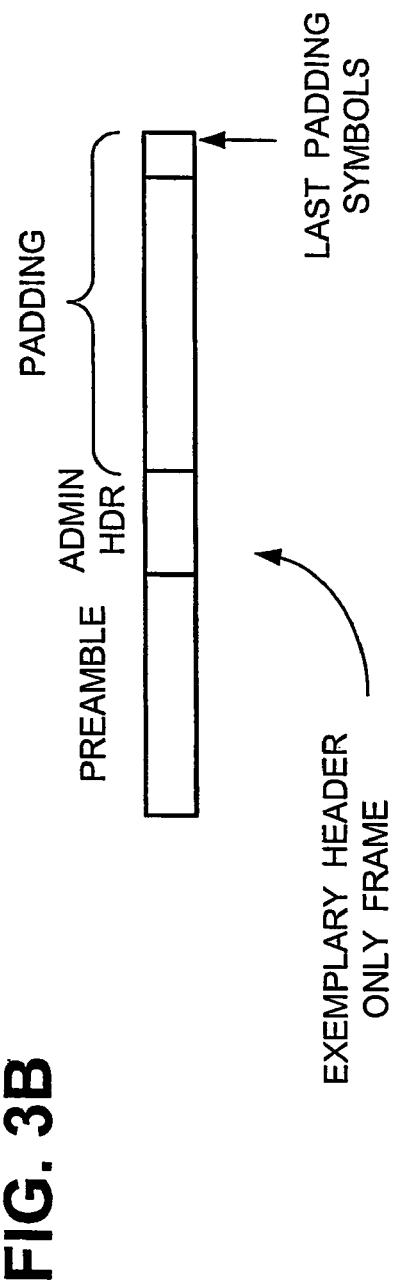
FIG. 3B is a schematic view illustrating the bit to symbol relationship of a data frame communication having no data with padding in accordance with embodiments of the present invention.

FIG. 3A is a schematic view illustrating the bit to symbol relationship of an exemplary data frame communication having data. FIG. 3B is a schematic view illustrating the bit to symbol relationship of an exemplary data frame communication having no data with padding symbols added to the frame in accordance with embodiments of the present invention such that minimum burst duration requirements are satisfied.

As described above, DSL systems which use burst transmission are generally known as Short-Term Stationary (STS) systems. An exemplary asynchronous transfer mode (ATM) frame with ATM cells having data, communicated on such a system, is illustrated in FIG. 3A. Such an STS system may be characterized by two distinct transmission states. An STS transceiver alternates between an ON state, in which a signal is transmitted, and an OFF state, in which either silence or a lower power and/or lower bandwidth signal is transmitted. The burst duration of individual ON periods may vary based on the presence of data to transmit and other factors. If the ON burst duration of a signal is significantly shorter than the minimum burst duration in which another DSL system can detect noise, the crosstalk may not be detected correctly. To prevent this occurrence, ANSI standard T1.417 requires that any burst transmission be at least 246 microseconds long. As noted above, it is possible that other regional requirements could be written that specify a different minimum burst duration.

Accordingly, embodiments of the present invention provide for a single DSL transceiver, located at either the central office 102 and/or the customer premises 106 (FIG. 1), to provide communications that satisfy the minimum burst duration requirements, or minimum frame length requirements, of the communication environment 100 in which the DSL transceiver is operating. Furthermore, because the regional minimum burst duration 224 (FIG. 2) described in greater detail below, and/or the regional padding symbol value 402 (FIG. 4), may be specified, a DSL transceiver configured with the variable burst duration system 200 of the present invention may be relocated to a another communication environment 100 having a different minimum burst duration requirement.

One embodiment meets the T1.417 requirement, or any other minimum burst duration requirement of the particular communication environment 100 in which the DSL transceiver is operating in, by adding a fixed number of padding symbols to empty frames to extend the duration (or frame length) of those frames to the required, predefined minimum time. In the embodiment described above, the duration of an empty frame is compared against the specified minimum burst duration, a difference in burst duration (or frame length) is determined, the number of padding symbols to be added to the frame to meet the minimum burst duration is determined, and the padding symbols are added into the frame. In another embodiment, described in greater detail below, a specified number of padding symbols are added in to the generated frame to meet the minimum burst duration requirement. In another embodiment, frames having cells, but which have a duration less than the specified minimum burst duration, have padding symbols added into the frame in accordance with the present invention.

Accordingly, when the CO DSL transceiver 102 (FIG. 1) generates a frame that is less than the specified regional burst duration, such as a header-only frame, the variable padding logic 222 (FIG. 2) is executed to add padding symbols such that the communicated frame is at least the minimum burst duration required by the T1.417 requirement or the applicable regional standard. Similarly when the CP DSL transceiver 112, 120 (FIG. 1) generates a frame that is less than the specified regional burst duration, the variable padding logic 222 is executed to add padding symbols such that the communicated frame is at least the minimum burst duration required by the T1.417 requirement or the applicable regional standard in which the DSL transceiver is operating.

In asynchronous transfer mode (ATM) cell based systems, transmissions can be extended in increments of a one cell transmission period. However, this may be excessive relative to customer-specific requirements. The end-of-pad indication of the present invention, described in greater detail below, allows a resolution to one symbol period. Key system requirements such as scrambler initialization require accurate detection of the last symbol in the communicated frame. In modulation, a false detection of the last symbol will cause a faulty upstream scrambler initialization and undetectable upstream data.

As described herein, embodiments provide that the minimum burst duration (or frame length) is made configurable to allow for a specific regional requirement. The minimum burst duration requirement of the particular communication environment 100 in which the DSL transceiver is operating in is specified into the regional minimum burst duration 224 region of memory 208 (FIG. 2). When a generated frame that is less than the specified regional burst duration, such as a header-only frame, is to be communicated over the communication channel 104, either by the CO DSL transceiver 102 or the CP DSL transceiver 106 (FIG. 1), the duration (or length) of the frame is evaluated by the variable padding logic 222 (FIG. 2). The determined duration of the generated frame is compared with the minimum burst duration requirement of the particular communication environment 100 in which the DSL transceiver is operating in, as specified in the regional minimum burst duration 224. A difference between the generated burst duration and the minimum burst duration is determined. The determined difference causes the variable padding logic 222 to add padding symbols into the generated frame, referred to herein as the "second generated frame" for convenience, so that the modified frame of sufficient size to meet the minimum burst duration requirement is communicated.

Figure 4:
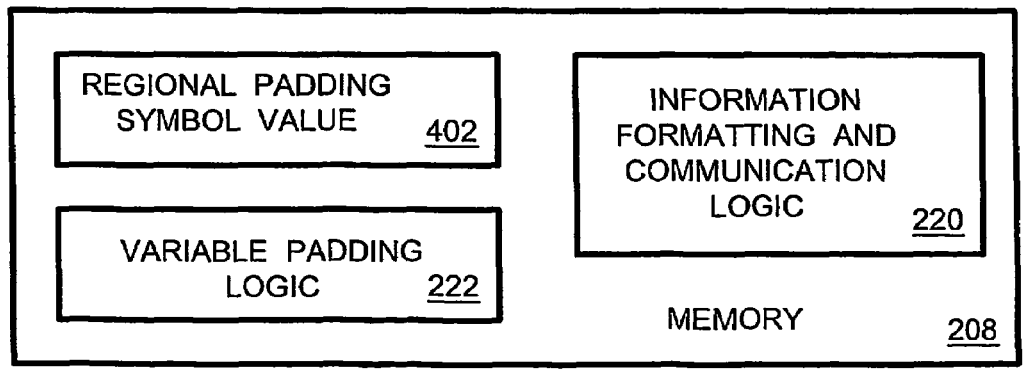
FIG. 4 is a block diagram illustrating another embodiment of a variable burst duration system implemented in the CO DSL transceiver and the CP DSL transceivers of FIG. 1.

FIG. 4 is a block diagram illustrating another embodiment of a variable burst duration system 200 implemented in the CO DSL transceiver 102 and the CP DSL transceivers 112, 120 (FIG. 1). Elements common to the above-described embodiment illustrated in FIG. 2 are not described or illustrated again for convenience. This embodiment includes in memory 208 the information formatting and communication logic 220, the variable padding logic 222 and the regional padding symbol value 402.

With this embodiment, the value, or number of, padding symbols added to an empty frame is specified in a suitable manner. Before a generated frame having a duration that is less than the specified regional burst duration is communicated, the variable padding logic 222 is executed such that the specified number of padding symbols are inserted into the generated frame. The specified value may be the exact number of padding symbols to be added to meet the minimum burst duration requirements, or a greater number of padding symbols may be added to provide margin in the length of the communicated cell.

The required minimum burst duration 224 (FIG. 2) and/or the regional padding symbol value 402 (FIG. 4) can be configured locally or remotely from a central site or a network management system. Accordingly, the variable padding logic 222 is configured to receive inputs from an external device such that the minimum burst duration requirement of the particular communication environment 100 in which the DSL transceiver is operating in is specified into the regional minimum burst duration 224 and/or the regional padding symbol value 402. It is understood that any suitable means for specifying the regional minimum burst duration 224 and/or the regional padding symbol value 402 may be implemented by embodiments of the present invention. Remote configuration of the header-only frame size is enabled by a configuration field in the Embedded Operations Channel (EOC) register set.

The mechanism for padding the frame is improved to provide a reliable end-of-pad indication, so that reconfiguration of the minimum burst duration does not require tight synchronization between transmitting and receiving modems. The end-of-pad indication is a low autocorrelation sequence of symbols which allows detection of the sequence in time even in the presence of one or more symbol errors. An exemplary frame with padding, according to the present invention, is illustrated in FIG. 3B. Other embodiments of a frame, or other burst communication formats, are constructed in accordance with the present invention.

In one embodiment, binary zeros are encoded and scrambled to encode the transmitted pad. Scrambling allows the receiver to perform adaptive tracking of timing and equalization parameters. One embodiment encodes eight final pad symbols with a specific data sequence which has good autocorrelation properties signals the end of the pad. Other embodiments use other numbers of final pad symbols. The final pad symbols allow accurate identification of the last symbol even in the presence of data errors.

Making the minimum burst duration configurable allows new regional or customer-specific requirements to be accommodated without requiring a change in the design and/or manufacture of the product or technology. Making remote configuration possible from a central site or network management system, in one embodiment, allows the minimum burst duration to be optimized for specific deployments without requiring different models for different regions.

The addition of an end-of-pad indication allows the receiver to reliably detect the end of a minimum length frame without knowing in advance what the duration of the frame is. Reliable end-of-frame detection facilitates a reduction, or even minimization, of turnaround time and latency, and facilitates, or even maximizes, throughput in time duplex transmission systems.

In one embodiment, header padding is applied to header-only frames, which are transmitted when there are no ATM cells (user data, EOC, or idle) to send. The header padding adds symbols after the end of the frame header to pad the length (increase the duration) of the transmitted frame to the minimum time required to meet spectral compatibility requirements.

One embodiment uses a variable size pad with delineation to meet the required minimum transmission time in ANSI T1.417-2001. The frame size is made configurable in the embodiments to anticipate possible requirements in other regional standards that might not match the ANSI requirement.

It is important for time duplex modulation systems to have a well-defined indication of when a frame ends. Frames which carry cells can only end on a cell boundary and also transmit a last-frame-in-cell indicator to help with end of frame detection. Header-only frames, to which padding applies, can be almost any integer number of symbols in length once the padding is made configurable, so a reliable means is required to allow the receiver to know when the frame is ending. One embodiment of the variable pad incorporates a well defined sequence of symbols with low autocorrelation values (Barker sequence) as the last 7 symbols transmitted to identify the end of the frame. Other embodiments employ different numbers and or types of last symbols for delineation, such as, but not limited to, an end of file (EOF) flag, a predefined series of ones and/or zeros, or an High-level Data Link Control (HDLC) type flag.

Accordingly, various embodiments of the present invention may provide for one or more of the following:
 Configurable symbol padding to allow minimum transmission time to be optimised to regional requirements.
 Remote configuration via EOC register field.
 Delineation of end-of-pad.
 Barker sequence used for delineation Padding symbols, in one embodiment, are transmitted after the header when the frame does not contain any cells. Such a frame may be referred to herein as a header-only frame. The number of padding symbols required for a header-only frame will vary based on the symbol rate and may also vary based on which transceiver is transmitting, and may be reconfigured via the EOC. The minimum transmission time, or burst duration, for a frame is set in the regional minimum burst duration 224 and/or the regional padding symbol value 402, referred to herein as the Time Domain Restrictions Register for convenience. The transceiver configured according to the present invention uses this value to determine the required number of padding symbols at a given symbol rate. In one embodiment, at least 7 padding symbols are always transmitted in a header-only frame.

In one embodiment, padding symbols are transmitted at 2 bits per symobl (bpS) and are generated from padding bits which are grouped, scrambled and encoded as specified for cell data bits. Other embodiments employ padding symbols transmitted at other rates.

The padding bits are defined as follows:

For a number of padding symbols (PS), a sequence of padding bits $PB_0$ through $PB_{2PS-1}$ are generated such that:

$PB_0$ through $PB_{2PS-15}=0$ $PB_{2PS-14}$ through $PB_{2PS-1}$ are defined in Table 1

In one embodiment, if PS=7 (the minimum number of padding symbols), then $PB_{2PS-14}=PB_0$ and the entire padding bits sequence consists of the end-of-padding delineation sequence defined in Table 1. The last 7 padding symbols are generated from the end-of-padding delineation sequence defined in Table 1 to provide an end-of-frame indication to the receiving CO DSL transceiver 108 or CP DSL transceiver 112, 120.

504, a regional minimum burst duration is specified. The specified regional minimum burst duration is saved in to memory 208 as described above. In another embodiment, a regional padding symbol value is specified. The specification may be made at the time of manufacture and/or distribution based upon the intended destination of the embodiment. That is, the specification of the regional minimum burst duration (or regional padding symbol value) is based upon the standards and/or requirement of the region to which the device is destined. Alternatively, if the embodiment is relocated or becomes subject to a different standard and/or requirement, a new regional minimum burst duration (or regional padding symbol value) may be specified at block 504.

At block 506 a frame is generated, including any ATM cells which have been received for transmission. The ATM cells may be received from a DTE device 118, 122 when the embodiment is at the customer premises 106, or from an external system 110 when the embodiments is at the central office 102 (FIG. 1). There may be no ATM cells received at the time the frame is generated, in which case an empty frame is generated.

At block 508 the burst duration of the generated frame is compared with the specified regional minimum burst duration. That is, a difference in burst duration is determined. In another embodiment, a difference in frame length is determined between the generated frame and a required regional minimum frame length. At block 510 a determination is made whether the burst duration of the generated frame is at least equal to the regional minimum burst duration. If so (the YES condition), the generated frame is communicated at block 512. For example, the generated frame likely contains data such that the burst duration (or frame length) results in a burst

TABLE 1

| | End-of-padding delineation sequence | | | | | | | | | | | | | |
|---|---|---|---|---|---|---|---|---|---|---|---|---|---|---|
| j | 14 | 13 | 12 | 11 | 10 | 9 | 8 | 7 | 6 | 5 | 4 | 3 | 2 | 1 |
| $PB_{2PS-j}$ | 1 | 1 | 1 | 1 | 1 | 1 | 0 | 0 | 0 | 0 | 1 | 1 | 0 | 0 |

Figure 5:
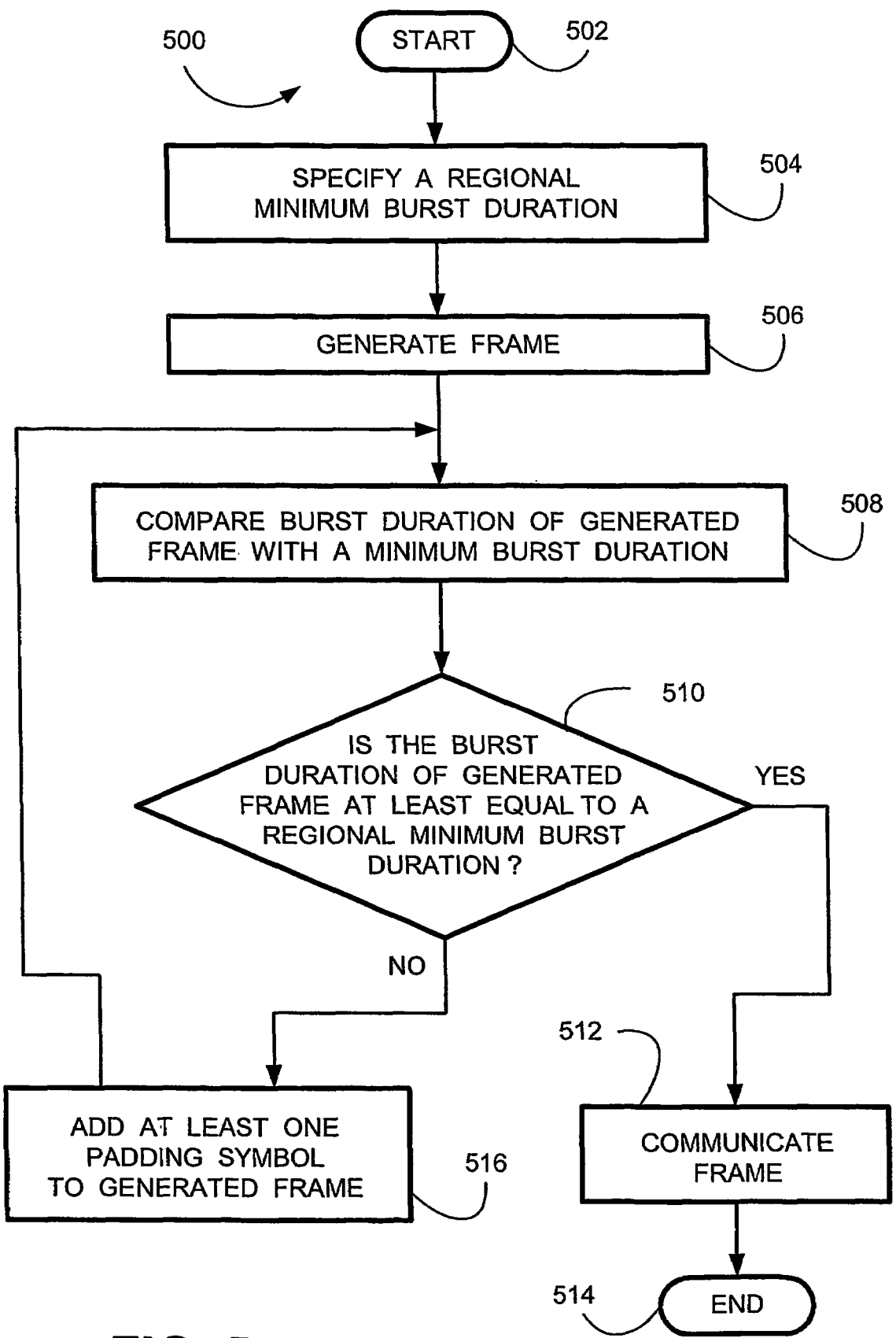
FIG. 5 is a flow chart illustrating one embodiment of the operation of the variable padding logic.

FIG. 5 is a flow chart 500 illustrating one embodiment of the operation of the variable padding logic 222 (FIG. 2). The flow chart 500 shows the architecture, functionality, and operation of a possible implementation of the software for implementing the variable burst duration system 200. In this regard, each block may represent a module, segment, or portion of code, which comprises one or more executable instructions for implementing the specified logical function(s). It should also be noted that in some alternative implementations, the functions noted in the blocks may occur out of the order noted in FIG. 5 or may include additional functions without departing significantly from the functionality of the variable burst duration system 200. For example, two blocks shown in succession in FIG. 5 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure for the variable burst duration system 200 and to be protected by the accompanying claims.

The process starts at block 502, wherein the variable padding logic 222 (FIG. 2) is executed by processor 202. At block duration that is at least equal to the regional minimum burst duration. The process then ends at block 514.

If at block 510 the burst duration of the generated frame is less than the regional minimum burst duration (the NO condition), the process proceeds to block 516 wherein a padding symbol is added to the generated frame, thereby generating a second frame. The process returns to block 508 and continues as described above. In one embodiment, only one padding symbol is added to the frame. In another embodiment, a predetermined number of padding symbol are added. In yet another embodiment, the number of padding symbol specified in the regional padding symbol value 402 region of memory 208 (FIG. 4) are added to the frame. Eventually, the burst duration of the second frame is at least equal to the regional minimum burst duration such that the second frame is communicated at block 512.

As described herein, embodiment of the system and method for a variable burst duration system 200 can be implemented in software, hardware, or a combination thereof. In a preferred embodiment(s), selected portions of the system and method for a variable burst duration system 200 are implemented in hardware and software. The hardware portion of the invention can be implemented using specialized hardware logic. The software portion can be stored in a memory and be executed by a suitable instruction execution system (microprocessor). The hardware implementation of the system and method for a variable burst duration system 200 can include any or a combination of the following technologies, which are all well known in the art: a discrete logic circuit(s) having logic gates for implementing logic functions upon data signals, an application specific integrated circuit having appropriate logic gates, a programmable gate array(s) (PGA), a field programmable gate array (FPGA), etc Furthermore, the variable burst duration system 200 software, which comprises an ordered listing of executable instructions for implementing logical functions, can be embodied in any computer-readable medium. Moreover, use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: a electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed. As the program can be electronically captured, via for instance optical scanning of the paper or other medium, then compiled, interpreted or otherwise processed in a suitable manner if necessary, and then stored in a computer memory.

Therefore, having thus described the invention, at least the following is claimed:

1. A method for extending the duration of a communicated frame, the method comprising:
    receiving configuration input that corresponds to a minimum burst transmission time for crosstalk detection;
    setting a specified minimum duration of time based on the configuration input;
    generating a frame;
    comparing the specified minimum duration of time with a duration of time associated with the generated frame;
    adding at least one padding symbol to the generated frame such that a duration of a second frame is increased at least to a duration corresponding to at least the specified minimum duration; and
    communicating the second frame.

2. The method of claim 1, further comprising adding a last sequence of symbols, the sequence indicating an end of the second frame.

3. The method of claim 1, wherein adding the padding symbols further comprises varying the number of symbols added to the generated frame.

4. The method of claim 1, further comprising determining a duration difference between the duration of the generated frame and the minimum duration.

5. The method of claim 4, further comprising determining the number of padding symbols, wherein the determined number of padding symbols corresponds to the determined duration difference.

6. The method of claim 1, further comprising specifying the minimum duration.

7. The method of claim 6, further comprising changing the specified minimum duration to a second minimum duration, wherein the number of padding symbols corresponds to the second minimum duration.

8. The method of claim 1, wherein the configuration input is received remotely.

9. A system which extends the duration of a frame to be communicated, comprising:
    a first interface configured to receive data to be communicated;
    a processor configured to receive configuration input that corresponds to a minimum burst transmission time for crosstalk detection, configured to set a specified minimum duration of time based on the configuration input, configured to generate a frame to be communicated, configured to compare the specified minimum duration of time with a duration of time associated with the generated frame, and configured to add at least one padding symbol to the generated frame to generate a second frame, the second frame having a duration at least equal to the minimum duration;
    a memory configured to store the specified minimum duration of time;
    a second interface configured to communicate the second frame onto a communication channel.

10. The system of claim 9, wherein the memory further comprises a specified minimum duration corresponding to the specified regional minimum duration.

11. The system of claim 9, wherein the memory further comprises a regional padding symbol value corresponding to the specified regional minimum duration.

12. The system of claim 9, wherein the system comprises at least one selected from a group consisting of a computer terminal 116, a digital telephone device, an Internet television device, an audio device, a multimedia device, a facsimile (fax) device, a graphic device, a high-speed Internet device, a high-speed local access network (LAN) device, an Internet telephone device, a stereo/audio device, a digital television device, a digital video cassette recorder device, a utility meter device, a home management device and a security device.

13. The system of claim 9, wherein the specified minimum duration is a ANSI T1.417 minimum transmission time.

14. The system of claim 9, wherein the specified minimum duration is configurable.

15. The system of claim 9, wherein the processor is configured to determine a number of padding symbols based on the symbol rate, and wherein the processor is configured to add the number of padding symbols to the generated frame to generate a second frame.

16. The system of claim 9, wherein the data to be communicated is an ATM cell.

17. The system of claim 16, wherein the ATM cell is a header only cell.

18. The system of claim 9, wherein the at least one padding symbol includes a barker sequence.

19. The system of claim 9, wherein the at least one padding symbol includes a delineation of an end-of-pad.

20. The system of claim 9, wherein the system is configured to have the configuration input received remotely.

21. A system which extends the duration of a frame to be communicated, comprising:

means for receiving configuration input that corresponds to a minimum burst transmission time for crosstalk detection;

means for setting a specified minimum duration of time based on the configuration input;

means for receiving data to be communicated;

means for generating a frame;

means for comparing the specified minimum burst duration of time with a burst duration of time associated with the generated frame;

means for adding at least one padding symbol to the generated frame such that a burst duration of a second frame is increased at least to a predetermined burst duration corresponding to at least the specified minimum burst duration; and means for communicating the second frame.

22. The system of claim 21, wherein the means for receiving configuration input receives the configuration input remotely.

23. A computer-readable storage medium encoded thereon a computer program for extending the duration of a communicated frame, the program when executed performs the steps of:

receiving configuration input that corresponds to a minimum burst transmission time for crosstalk detection;

setting a specified minimum duration of time based on the configuration input;

receiving a data to be communicated;

generating a frame;

comparing the specified minimum duration with a duration of time associated with the generated frame;

adding at least one padding symbol to the generated frame such that a duration of a second frame is increased at least to a predetermined duration corresponding to at least the specified minimum duration; and communicating the second frame.

24. The computer readable storage medium of claim 23, wherein the configuration input is received remotely.

* * * * *